US012661916B2

(12) United States Patent
Kobayashi et al.

(10) Patent No.: US 12,661,916 B2
(45) Date of Patent: Jun. 23, 2026

(54) PRINTING DEVICE

(71) Applicant: SEIKO EPSON CORPORATION, Tokyo (JP)

(72) Inventors: Mafumi Kobayashi, Matsumoto (JP); Haruki Miyasaka, Matsumoto (JP); Kazuhisa Takeda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 18/414,603

(22) Filed: Jan. 17, 2024

(65) Prior Publication Data

US 2024/0246347 A1 Jul. 25, 2024

(30) Foreign Application Priority Data

Jan. 20, 2023 (JP) ................................ 2023-006946

(51) Int. Cl.
*B41J 29/13* (2006.01)
*B41J 2/165* (2006.01)

(52) U.S. Cl.
CPC .............. *B41J 29/13* (2013.01); *B41J 2/165* (2013.01); *B41J 2/16508* (2013.01); *B41J 2/16517* (2013.01)

(58) Field of Classification Search
CPC ........ B41J 29/13; B41J 2/165; B41J 2/16508; B41J 2/16517; B41J 2/16526; B41J 29/02
See application file for complete search history.

(56) References Cited

U.S. PATENT DOCUMENTS 7,240,982 B2 * 7/2007 Sanpei ................ B41J 2/14274 347/29
2014/0232795 A1 8/2014 Yanagishita
2021/0379892 A1 * 12/2021 Nakata ................ B41J 2/16517

FOREIGN PATENT DOCUMENTS

JP 2014-156062 A 8/2014

* cited by examiner

*Primary Examiner* — Justin Seo
(74) *Attorney, Agent, or Firm* — WORKMAN NYDEGGER

(57) ABSTRACT

A printing device includes: a medium support unit including a support surface configured to support at least a printing region of a medium; a medium accommodating unit configured to accommodate a region of the medium not supported by the support surface; a head configured to discharge a liquid onto the medium supported by the support surface; a first head moving unit configured to move the head in a first direction parallel to the support surface; a second head moving unit configured to move the head in a second direction that is parallel to the support surface and intersects the first direction; a maintenance unit performs maintenance of the head; and a maintenance cover configured to cover a side of the maintenance unit in the third direction configured to face the head in the maintenance unit.

8 Claims, 12 Drawing Sheets

PRINTING DEVICE

The present application is based on, and claims priority from JP Application Serial Number 2023-006946, filed Jan. 20, 2023, the disclosure of which is hereby incorporated by reference herein in its entirety.

BACKGROUND

1. Technical Field

The present disclosure relates to a printing device.

2. Related Art

For example, JP-A-2014-156062 discloses a printing device that performs printing on a medium such as a T-shirt. In such a printing device, by placing the medium on a support surface of a medium support unit outside a housing and then moving the medium support unit on which the medium is placed in a horizontal direction, the medium can be moved from the outside of the housing to an inside of the housing. Thus, it is possible to perform printing on the medium moved from the outside of the housing to the inside of the housing after the medium has been placed on the support surface outside the housing.

However, in such a printing device, the medium support unit has to be moved to the outside of the housing at the time of placing the medium, which results in an increase in a size of the printing device. In addition, although it is conceivable to place the medium on the support surface of the medium support unit inside the housing, there is a risk that the medium may be contaminated with a liquid when the medium is placed on the support surface.

SUMMARY

A printing device for solving the above problems includes: a medium support unit including a support surface configured to support at least a printing region of a medium; a medium accommodating unit configured to accommodate a region of the medium not supported by the support surface; a head configured to discharge a liquid onto the medium supported by the support surface; a first head moving unit configured to move the head in a first direction parallel to the support surface; a second head moving unit configured to move the head in a second direction that is parallel to the support surface and intersects the first direction; a maintenance unit that is disposed at a position in the first direction of the medium support unit, at which the maintenance unit is configured to face the head in a third direction intersecting the first direction and the second direction, and performs maintenance of the head; and a maintenance cover configured to cover a side of the maintenance unit in the third direction configured to face the head in the maintenance unit.

DESCRIPTION OF EMBODIMENTS

First Embodiment

An embodiment of a printing device will be described below. In the following description, a direction intersecting (for example, orthogonal to) a vertical direction Z is referred to as a width direction X, and a direction intersecting the vertical direction Z and the width direction X is referred to as a front to rear direction Y. One side in the width direction X is referred to as a first width direction X1, and the other side in the width direction X is referred to as a second width direction X2. One side in the front to rear direction Y is referred to as a front side Y1, and the other side in the front to rear direction Y is referred to as a rear side Y2. The upper side in the vertical direction Z is referred to as an upper side Z1, and the lower side in the vertical direction Z is referred to as a lower side Z2. The width direction X corresponds to an example of a first direction. The front to rear direction Y corresponds to an example of a second direction. The vertical direction Z corresponds to an example of a third direction.

Printing Device 10

Figure 1:
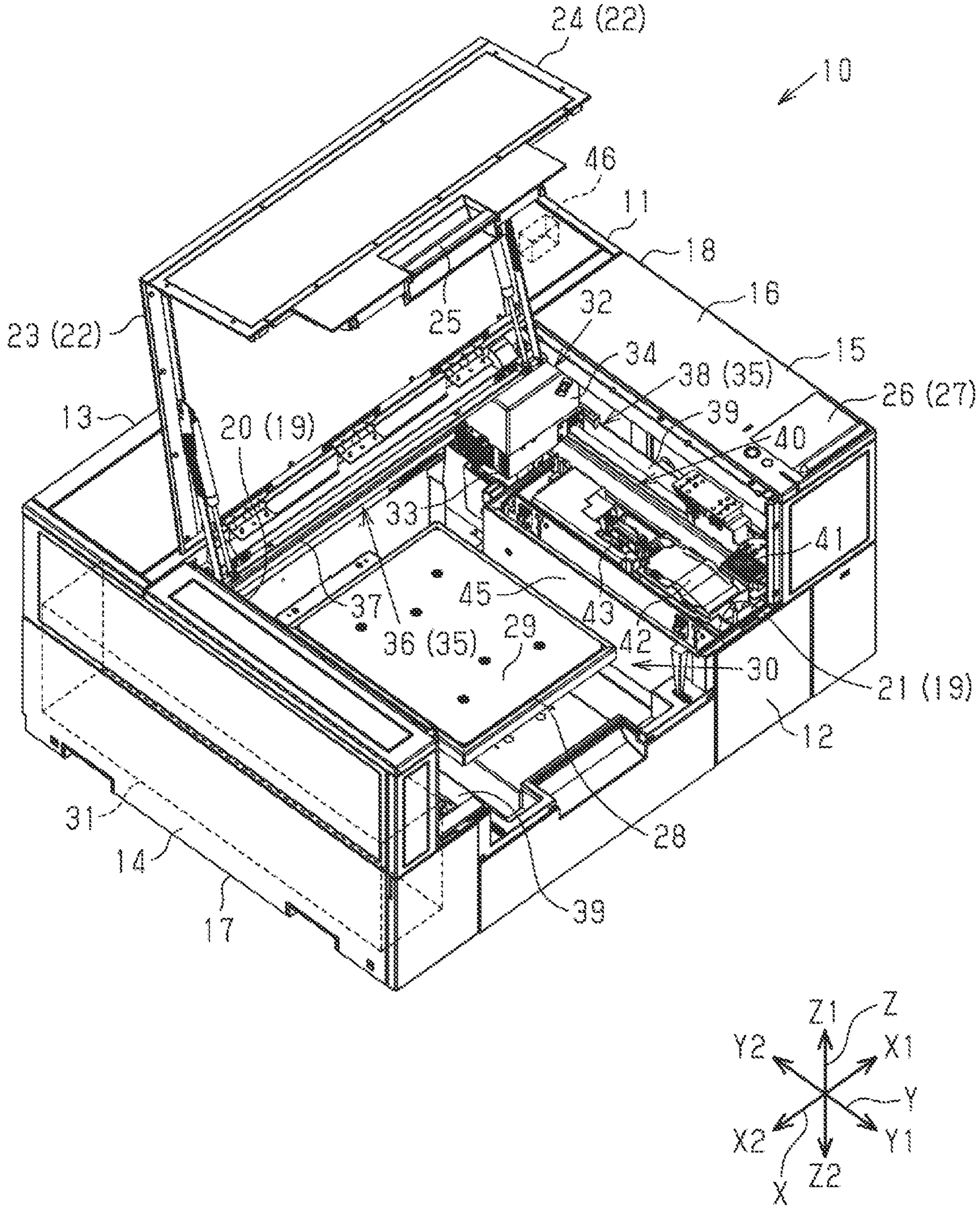
FIG. 1 is a perspective view showing a printing device.

As showing in FIG. 1, a printing device 10 is configured to perform printing on a medium. The printing device 10 may be configured to perform printing on a medium by discharging a liquid. The printing device 10 may be configured to perform printing on a flexible medium such as a T-shirt. The printing device 10 may be configured such to have a medium placed therein by a user.

Housing 11

The printing device 10 includes a housing 11. The housing 11 may be rectangular. The housing 11 includes a front surface 12 facing the front side Y1. The housing 11 includes a back surface 13 facing the rear side Y2. The housing 11 includes a left side surface 14 facing in the second width direction X2. The housing 11 includes a right side surface 15 facing in the first width direction X1. The housing 11 includes a top surface 16 facing the upper side Z1. The housing 11 includes a bottom surface 17 facing the lower side Z2.

The housing 11 is configured to accommodate various members included in the printing device 10. In particular, the housing 11 accommodates a medium support unit 28, a liquid supply unit 31, a printing unit 32, and a maintenance unit 40, which will be described later.

The housing 11 includes a housing frame 18. The housing frame 18 forms an exterior of the housing 11. The housing frame 18 includes an opening portion 19. That is, the housing 11 includes the opening portion 19. The opening portion 19 is configured to expose the various members accommodated in the housing 11. In particular, the opening portion 19 is configured to expose a support surface 29 of the medium support unit 28, which will be described later.

The opening portion 19 includes a first opening portion 20 and a second opening portion 21. The first opening portion 20 is provided at the top surface 16. The second opening portion 21 is provided at the front surface 12. The first opening portion 20 and the second opening portion 21 are provided to be continuous with each other. That is, the opening portion 19 is provided across the top surface 16 and the front surface 12.

The housing 11 includes an opening and closing cover 22. The opening and closing cover 22 can open and close the opening portion 19. The opening and closing cover 22 may be made of a sheet metal to ensure rigidity. The opening and closing cover 22 includes a first opening and closing cover 23. The first opening and closing cover 23 has a flat plate shape. The first opening and closing cover 23 can open and close the first opening portion 20.

The opening and closing cover 22 includes a second opening and closing cover 24. The second opening and closing cover 24 has a flat plate shape. The second opening and closing cover 24 can open and close the second opening portion 21. The second opening and closing cover 24 includes a grip unit 25. The grip unit 25 can be gripped by the user.

The printing device 10 includes a display unit 26 and an operation unit 27. The display unit 26 is configured to display information. The operation unit 27 is configured to be operable by the user. The display unit 26 and the operation unit 27 may be integrally configured as a touch panel, or may be separately configured. The display unit 26 and the operation unit 27 are provided on the top surface 16, but are not limited thereto.

Medium Support Unit 28

The printing device 10 includes the medium support unit 28. The medium support unit 28 is configured to support the medium. The medium support unit 28 includes the support surface 29. The support surface 29 is a surface facing the upper side Z1. The support surface 29 is configured to support the medium. In particular, the support surface 29 is a surface that supports at least a printing region of the medium.

The medium support unit 28 is configured not to move in the horizontal direction parallel to the support surface 29. That is, the support surface 29 is configured not to move in the horizontal direction. The medium support unit 28 can adjust a position of the support surface 29 in the vertical direction Z.

The printing device 10 includes a medium accommodating unit 30. The medium accommodating unit 30 is accommodated in the housing 11. The medium accommodating unit 30 is provided in at least the width direction X of the support surface 29, and may also be provided in the front to rear direction Y. When a partial region of the medium is supported by the support surface 29, the medium accommodating unit 30 can accommodate a partial region of the medium that is not supported by the support surface 29.

Liquid Supply Unit 31

The printing device 10 includes the liquid supply unit 31. The liquid supply unit 31 is provided on a side in the second width direction X2 from the medium support unit 28 and the medium accommodating unit 30. The liquid supply unit 31 may be provided along an inner wall surface of the left side surface 14. The liquid supply unit 31 is configured to contain the liquid and to supply the contained liquid to a head 33, which will be described later. The liquid supply unit 31 may be of a removable cartridge type, or may be of a tank type that can be replenished with liquid. A top surface of the liquid supply unit 31 may be a flat surface.

Printing Unit 32

The printing device 10 includes the printing unit 32. The printing unit 32 is configured to perform printing on the medium. In particular, the printing unit 32 is configured to perform printing on the medium supported by the support surface 29.

The printing unit 32 includes the head 33. The head 33 can discharge the liquid onto the medium supported by the support surface 29. The head 33 includes a plurality of nozzles (not shown) that can discharge liquids. The head 33 includes a nozzle surface (not shown) on which the plurality of nozzles are open. The nozzle surface is a surface facing the lower side Z2.

The printing unit 32 includes a carriage 34. The carriage 34 is configured to support the head 33. The head 33 is configured as a serial type. In the serial type, printing is performed while the head 33 moves in the width direction X.

The printing unit 32 includes a head moving unit 35. The head moving unit 35 is configured to move the carriage 34. That is, the head moving unit 35 is configured to move the head 33. The head moving unit 35 is configured to move the head 33 in the horizontal direction. Specifically, the head moving unit 35 is configured to move the head 33 in the width direction X and the front to rear direction Y.

The head moving unit 35 includes a first head moving unit 36. The first head moving unit 36 is configured to move the carriage 34 in the width direction X. That is, the first head moving unit 36 is configured to move the head 33 in the width direction X parallel to the support surface 29.

The first head moving unit 36 includes a first guide unit 37. The first guide unit 37 is configured to extend in the width direction X across the support surface 29. The first guide unit 37 guides the carriage 34 to be movable in the width direction X.

The head moving unit 35 includes a second head moving unit 38. The second head moving unit 38 is configured to support the first head moving unit 36. The second head moving unit 38 is configured to move the first head moving unit 36 in the front to rear direction Y. That is, the second head moving unit 38 is configured to move the head 33 in the front to rear direction Y parallel to the support surface 29.

The second head moving unit 38 includes a pair of second guide units 39. The pair of second guide units 39 are provided in the first width direction X1 and the second width direction X2 of the medium support unit 28, with the medium support unit 28 interposed therebetween. Each of the pair of second guide units 39 is configured to extend in the front to rear direction Y.

In this manner, the head moving unit 35 carries the head 33 and is movable in the horizontal direction across the medium support unit 28. The head moving unit 35 is configured in a gate shape in a front view. The head moving unit 35 is able to move the head 33 within a movement range. The movement range of the head 33 includes a facing position and a retracted position. The facing position is a position at which the nozzle surface of the head 33 faces the support surface 29. The retracted position is a position at which the nozzle surface of the head 33 does not face the support surface 29. The retracted positions include a standby position. The standby position is a position at which the head 33 is disposed when printing is not being performed. The standby position may be located, within the movement range, on a side in the first width direction X1 and on the rear side Y2. Further, the retracted position includes a maintenance position. The maintenance position is a position at which the nozzle surface of the head 33 faces the maintenance unit 40, which will be described later. That is, the movement range of the head 33 includes the maintenance position.

Maintenance Unit 40

The printing device 10 includes the maintenance unit 40. The maintenance unit 40 is provided on a side in the first width direction X1 from the medium support unit 28 and the medium accommodating unit 30. The maintenance unit 40 is configured to extend in the front to rear direction Y. The maintenance unit 40 is disposed at a position at which it does not overlap the medium support unit 28 and the medium accommodating unit 30 in the vertical direction Z. The maintenance unit 40 is disposed at a position at which it can face the head 33 toward the upper side Z1. The maintenance unit 40 is configured to perform maintenance of the head 33.

The maintenance unit 40 includes a flushing unit 41. The flushing unit 41 is configured to receive the liquid discharged from the head 33. The flushing unit 41 is configured to be movable in the front to rear direction Y together with the head 33, but may be configured to extend in the front to rear direction Y. The flushing unit 41 may be moved in the front to rear direction Y by the same power source as the second head moving unit 38, or may be moved in the front to rear direction Y by a power source different from the second head moving unit 38. The flushing unit 41 is disposed at a position at which it does not overlap the medium support unit 28 and the medium accommodating unit 30 in the vertical direction Z.

The maintenance unit 40 includes a wiping unit 42. The wiping unit 42 can wipe the nozzle surface. The wiping unit 42 is disposed at a position at which it does not overlap the medium support unit 28 and the medium accommodating unit 30 in the vertical direction Z.

The maintenance unit 40 includes a suction unit 43. The suction unit 43 is configured to suck the liquid from the head 33. The suction unit 43 may include a suction pump that sucks the liquid from the head 33. The suction unit 43 is disposed at a position at which it does not overlap the medium support unit 28 and the medium accommodating unit 30 in the vertical direction Z.

Also, the maintenance unit 40 may include a waste liquid tank (not shown). The waste liquid tank is configured to store the liquid received by the flushing unit 41. The waste liquid tank is configured to store the liquid sucked by the suction unit 43. The waste liquid tank is disposed at a position at which it does not overlap the medium support unit 28 and the medium accommodating unit 30 in the vertical direction Z.

Maintenance Cover 44

Figure 2:
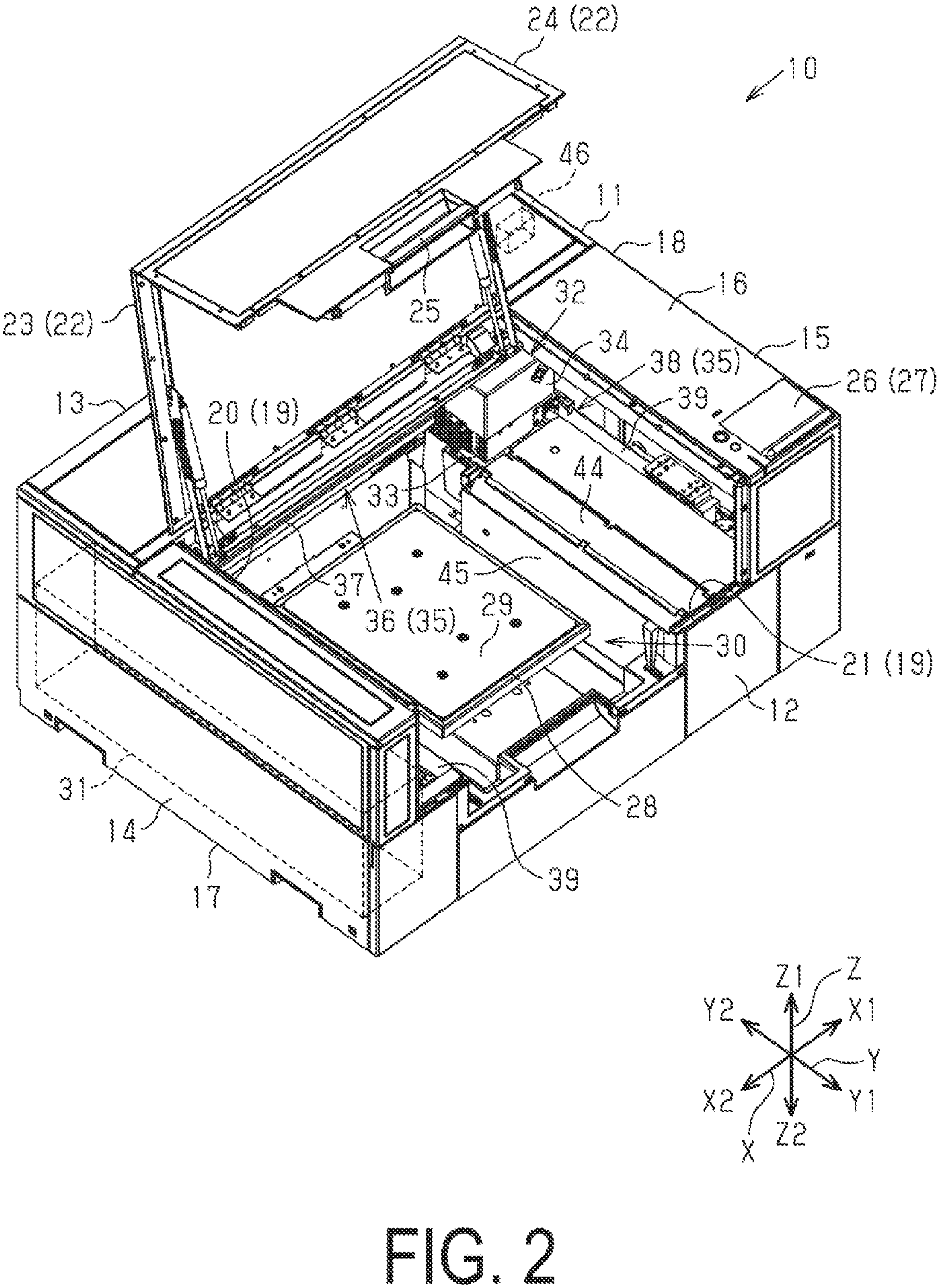
FIG. 2 is a perspective view showing the printing device.

As shown in FIG. 2, the printing device 10 may include a maintenance cover 44. The maintenance cover 44 is a cover that can cover the upper side Z1 of the maintenance unit 40.

The printing device 10 includes a cover accommodating unit 45. The cover accommodating unit 45 is provided between the medium support unit 28, the medium accommodating unit 30, and the maintenance unit 40 in the width direction X. The cover accommodating unit 45 can accommodate the maintenance cover 44.

In this way, the maintenance cover 44 is movable between a cover position shown in FIG. 2 and an accommodation position shown in FIG. 1. The cover position is a position at which the upper side Z1 of the maintenance unit 40 is covered. The accommodation position is a position at which the maintenance cover 44 is accommodated in the cover accommodating unit 45 without covering the upper side Z1 of the maintenance unit 40.

Control Unit 46

The printing device 10 includes a control unit 46. The control unit 46 controls the printing device 10. The control unit 46 controls various operations executed by the printing device 10. The control unit 46 may be configured as a circuit including α: one or more processors that execute various processes in accordance with a computer program, β: one or more dedicated hardware circuits that execute at least some of the various processes, or γ: a combination thereof. The hardware circuit is, for example, an application-specific integrated circuit. A processor includes a CPU and a memory such as a RAM or a ROM, and the memory stores program codes or instructions configured to cause the CPU to perform processing. The memory, that is, a computer-readable medium, includes any readable medium that can be accessed by a general purpose or special purpose computer.

Detailed Configuration of Maintenance Cover 44

Figure 3:
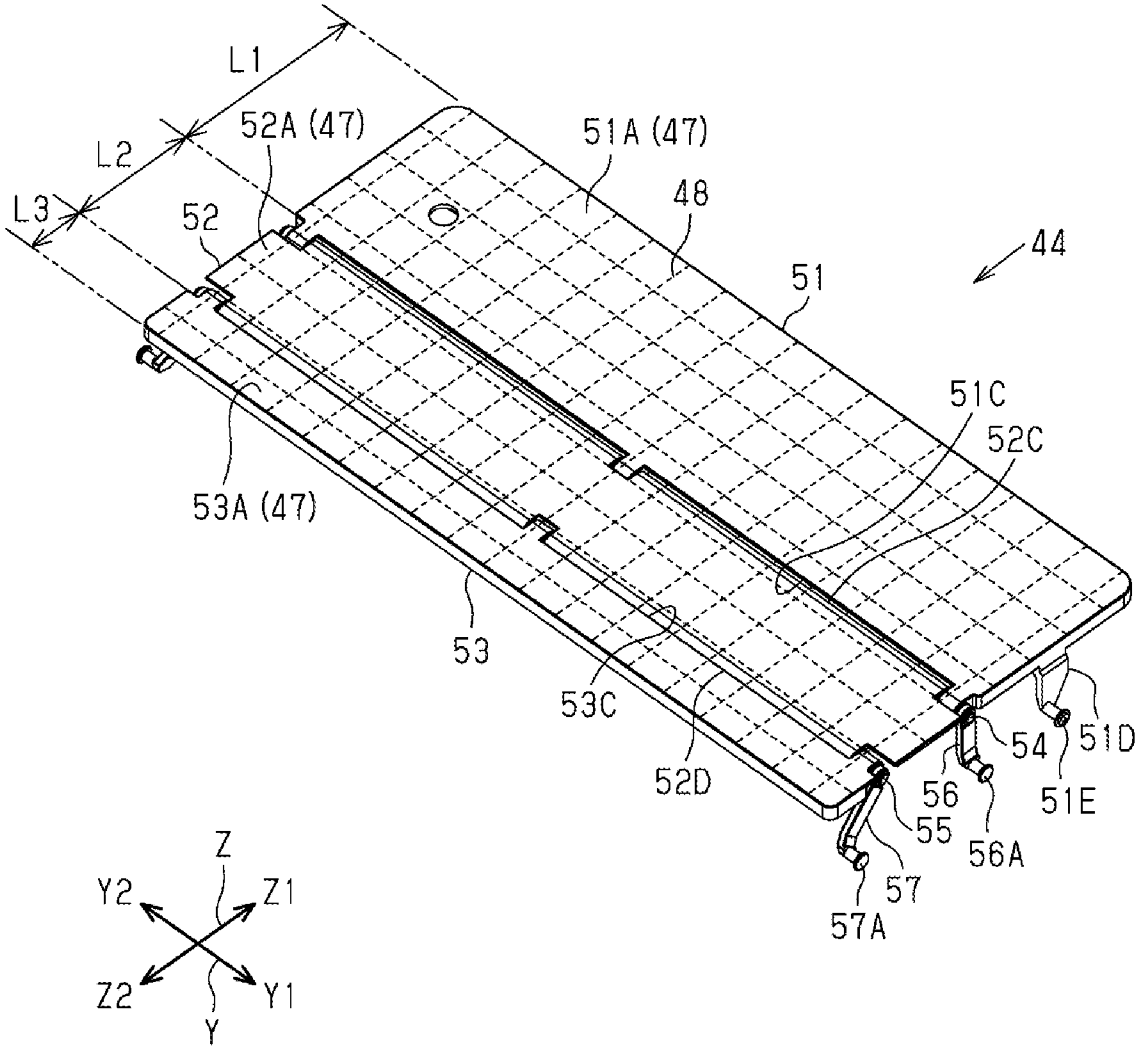
FIG. 3 is a perspective view showing a maintenance cover.
Figure 4:
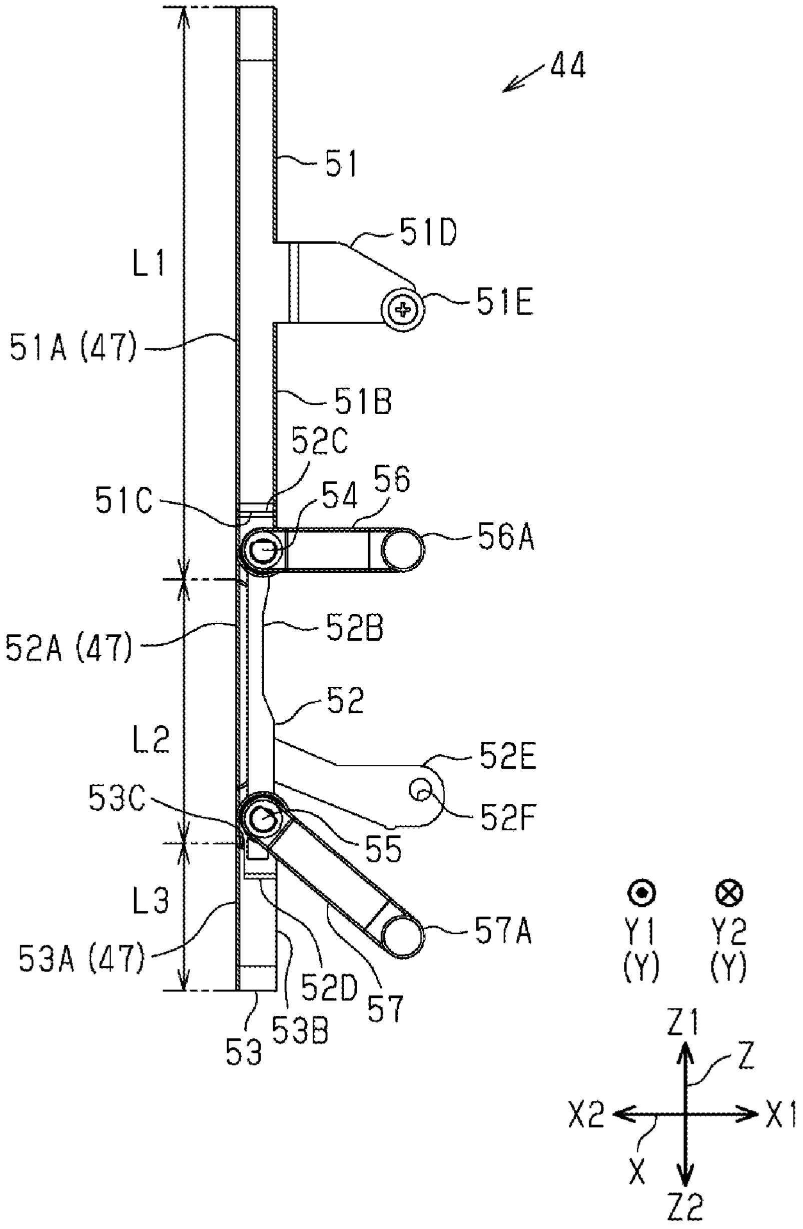
FIG. 4 is a front view showing the maintenance cover.

Here, a detailed configuration of the maintenance cover 44 will be described with reference to FIGS. 3 and 4. FIGS. 3 and 4 show a state in which the maintenance cover 44 is disposed at the accommodation position.

As shown in FIG. 3, the maintenance cover 44 includes an upper surface 47. The upper surface 47 is a surface facing the upper side Z1 when the maintenance cover 44 is disposed at the cover position. The upper surface 47 is a surface that can support a partial region of the medium that is not placed on the support surface 29 when the medium is placed on the support surface 29.

The maintenance cover 44 includes a positioning reference unit 48. The positioning reference unit 48 is provided on the upper surface 47. A dimension of the positioning reference unit 48 can be specified on the upper surface 47, and the positioning reference unit 48 has a grid shape, but may have a scale. When the maintenance cover 44 is disposed at the cover position, the positioning reference unit 48 can be visually recognized by the user as a reference position of the medium placed on the support surface 29. In this way, when the maintenance cover 44 is disposed at the cover position, the positioning reference unit 48 serves as a guide for placing the medium on the support surface 29. In addition, the positioning reference unit 48 may also be provided on a top surface of the liquid supply unit 31 on a side in the second width direction X2 of the medium support unit 28.

As shown in FIGS. 3 and 4, the maintenance cover 44 may include a plurality of cover units. The maintenance cover 44 may include a first cover unit 51, a second cover unit 52, and a third cover unit 53. The maintenance cover 44 may include a first shaft 54 and a second shaft 55.

The first cover unit 51 is a member whose longitudinal direction is the front to rear direction Y. The first cover unit 51 has a thin plate shape. The first cover unit 51 includes a first upper surface 51A. The first upper surface 51A forms a part of the upper surface 47. The first cover unit 51 includes a first back surface 51B. The first back surface 51B is a surface opposite to the first upper surface 51A.

The first cover unit 51 is located on the upper side Z1 of the second cover unit 52. The first cover unit 51 is pivotally attached to the first shaft 54 at one end portion 51C thereof on the lower side Z2. The first cover unit 51 is rotatably coupled to the second cover unit 52 via the first shaft 54 at the one end portion 51C.

The first cover unit 51 includes a first slider unit 51D. The first slider unit 51D is configured to extend in a direction perpendicular to the first back surface 51B on the first back surface 51B. The first slider unit 51D is fixed to the first back surface 51B. The first slider unit 51D includes a first slider 51E. The first slider 51E is provided at a tip portion of the first slider unit 51D.

The second cover unit 52 is a member whose longitudinal direction is the front to rear direction Y. The second cover unit 52 has a thin plate shape. The second cover unit 52 includes a second upper surface 52A. The second upper surface 52A forms a part of the upper surface 47. The second cover unit 52 includes a second back surface 52B. The second back surface 52B is a surface opposite to the second upper surface 52A.

The second cover unit 52 is located on the upper side Z1 from the third cover unit 53. The second cover unit 52 is rotatably attached to the first shaft 54 at one end portion 52C thereof on the upper side Z1. The second cover unit 52 is rotatably coupled to the first cover unit 51 via the first shaft 54 at the one end portion 52C. The second cover unit 52 is rotatably attached to the second shaft 55 at the other end portion 52D thereof on the lower side Z2. The second cover unit 52 is rotatably coupled to the third cover unit 53 via the second shaft 55 at the other end portion 52D.

The second cover unit 52 includes a protruding portion 52E. The protruding portion 52E is configured to protrude from the second back surface 52B. The protruding portion 52E includes an opening 52F. The opening 52F is provided at a tip portion of the protruding portion 52E. The protruding portion 52E is a member for moving the maintenance cover 44.

The third cover unit 53 is a member whose longitudinal direction is the front to rear direction Y. The third cover unit 53 has a thin plate shape. The third cover unit 53 includes a third upper surface 53A. The third upper surface 53A forms a part of the upper surface 47. The third cover unit 53 includes a third back surface 53B. The third back surface 53B is a surface opposite to the third upper surface 53A.

The third cover unit 53 is located on the lower side Z2 from the second cover unit 52. The third cover unit 53 is pivotally attached to the second shaft 55 at one end portion 53C thereof on the upper side Z1. The third cover unit 53 is rotatably coupled to the second cover unit 52 via the second shaft 55 at the one end portion 53C.

The first shaft 54 is configured to extend in the front to rear direction Y. The first shaft 54 is pivotally attached to the first cover unit 51. The first shaft 54 is rotatably attached to the second cover unit 52. The second shaft 55 is configured to extend in the front to rear direction Y. The second shaft 55 is pivotally attached to the third cover unit 53. The second shaft 55 is rotatably attached to the second cover unit 52.

The maintenance cover 44 includes a second slider unit 56. The second slider unit 56 is configured to protrude from the first back surface 51B and the second back surface 52B. The second slider unit 56 may be fixed to both end portions of the first shaft 54. In this way, an angle of the second slider unit 56 with respect to the first cover unit 51 is constant, and an angle of the second slider unit 56 with respect to the second cover unit 52 rotatable with respect to the first cover unit 51 can be changed. The second slider unit 56 includes a second slider 56A. The second slider 56A is provided at a tip portion of the second slider unit 56.

The maintenance cover 44 includes a third slider unit 57. The third slider unit 57 is configured to protrude from the second back surface 52B and the third back surface 53B. The third slider unit 57 may be fixed to both end portions of the second shaft 55. In this way, an angle of the third slider unit 57 with respect to the third cover unit 53 is constant, and an angle of the third slider unit 57 with respect to the second cover unit 52 rotatable with respect to the third cover unit 53 can be changed. The third slider unit 57 includes a third slider 57A. The third slider 57A is provided at a tip portion of the third slider unit 57.

The first cover unit 51 has a length L1 in the vertical direction Z. The second cover unit 52 has a length L2 in the vertical direction Z. The third cover unit 53 has a length L3 in the vertical direction Z. The length L1 may be longer than the length L2. The length L2 may be longer than the length L3. In this way, a cover portion closer to the cover accommodating unit 45 has a shorter length than a cover portion farther from the cover accommodating unit 45. Thus, when the maintenance cover 44 moves from the accommodation position to the cover position, a space in the upper side Z1 can be reduced. Accordingly, it is possible to save space in the vertical direction Z.

In FIG. 4, each of the first upper surface 51A, the second upper surface 52A, and the third upper surface 53A is parallel to the front to rear direction Y and parallel to the vertical direction Z. In the state shown in FIG. 4, a distance from the second back surface 52B to the second slider 56A may be the same as a distance from the first back surface 51B to the first slider 51E. A distance from the second shaft 55 to the third slider 57A may be longer than a distance from the first shaft 54 to the second slider 56A. A distance from the third back surface 53B to the third slider 57A may be the same as a distance from the second back surface 52B to the second slider 56A.

Detailed Configuration of Cover Accommodating Unit 45

Next, a detailed configuration of the cover accommodating unit 45 will be described with reference to FIGS. 5 to 7.

Figure 5:
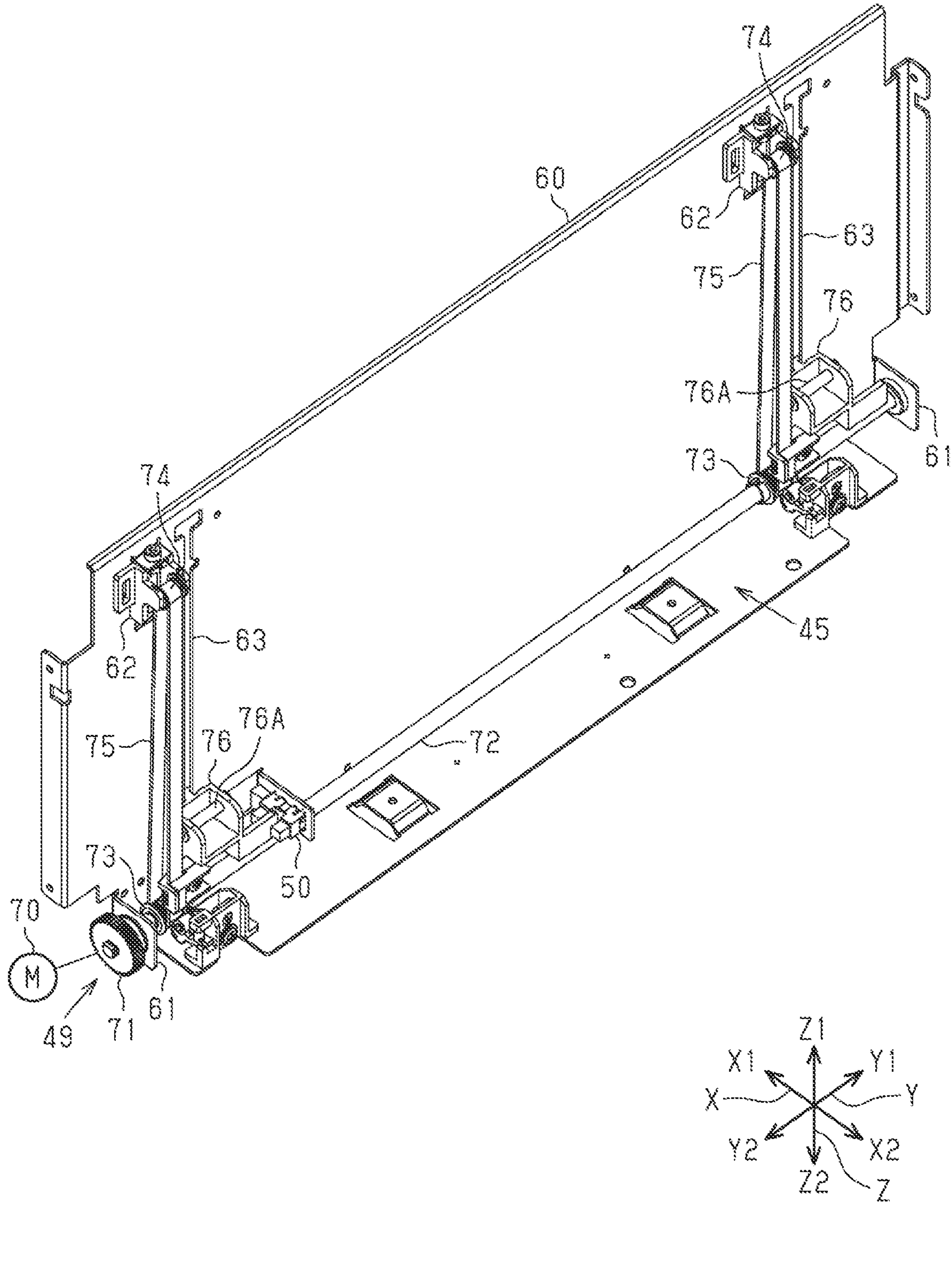
FIG. 5 is a perspective view showing a cover accommodating unit and a cover moving unit.
Figure 6:
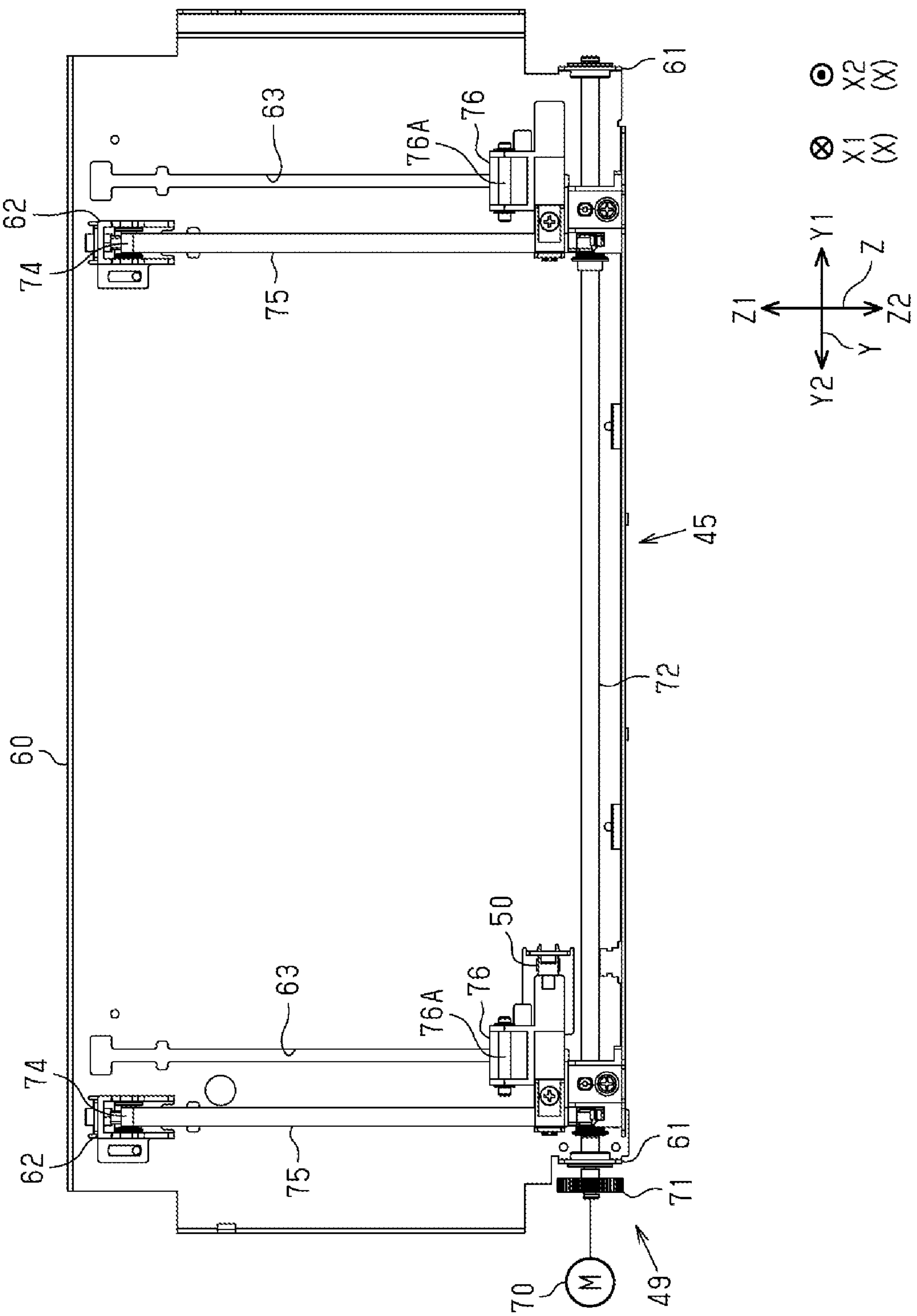
FIG. 6 is a side view showing the cover accommodating unit and the cover moving unit.

As shown in FIGS. 5 and 6, the cover accommodating unit 45 includes a side wall 60. The side wall 60 is located on a side in the first width direction X1 of the cover accommodating unit 45. The side wall 60 has a thin plate shape. The side wall 60 defines an accommodating region in which the maintenance cover 44 can be accommodated.

The side wall 60 includes a pair of first holding units 61. The pair of first holding units 61 are located on the front side Y1 and the rear side Y2 in the front to rear direction Y. The pair of first holding units 61 are configured to rotatably hold an interlocking shaft 72, which will be described later.

The side wall 60 includes a pair of pulley holding units 62. The pair of pulley holding units 62 are located on the front side Y1 and the rear side Y2 in the front to rear direction Y. The pair of pulley holding units 62 are configured to rotatably hold second pulleys 74, which will be described later.

The side wall 60 includes a pair of guide grooves 63. The pair of guide grooves 63 are located on the front side Y1 and the rear side Y2 in the front to rear direction Y. Each of the pair of guide grooves 63 is configured to extend in the vertical direction Z. Each of the pair of guide grooves 63 is a groove for guiding elevating units 76, which will be described later.

Figure 7:
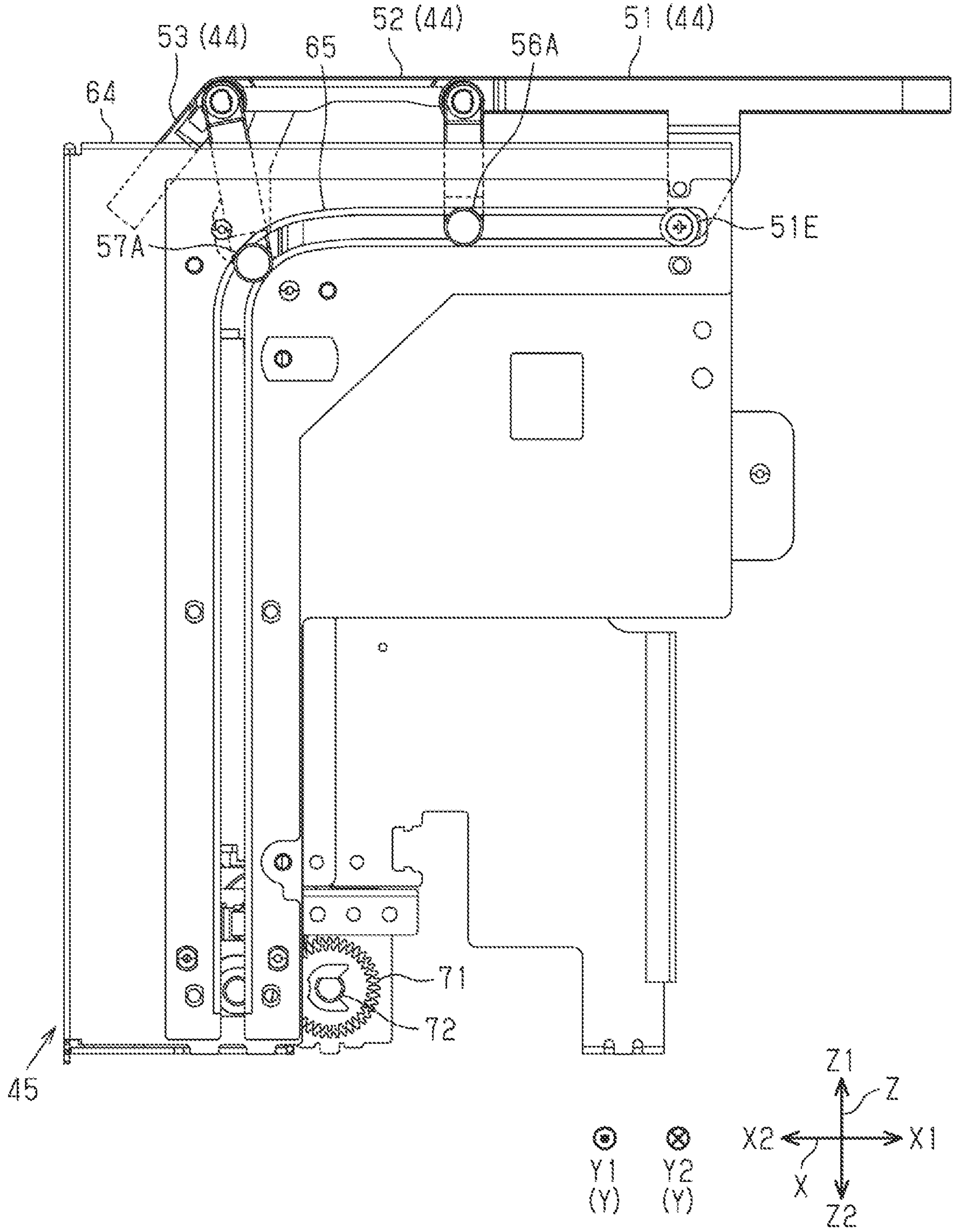
FIG. 7 is a front view showing the maintenance cover and the cover accommodating unit.

As shown in FIG. 7, the cover accommodating unit 45 includes a front wall 64. The front wall 64 is located on the front side Y1 of the cover accommodating unit 45. The front wall 64 has a thin plate shape. The front wall 64 defines an accommodating region in which the maintenance cover 44 can be accommodated.

The front wall 64 includes a guide rail 65. The first slider 51E, the second slider 56A, and the third slider 57A penetrate through the guide rail 65. The guide rail 65 extends from the lower side Z2 to the upper side Z1 in the vertical direction Z, forms an arc shape on the upper side Z1, and extends in the first width direction X1. In this way, the guide rail 65 extends to change its orientation. Thus, a space for accommodating the maintenance cover 44 can be secured and space saving can be achieved.

Also, the cover accommodating unit 45 includes a rear wall (not shown). The rear wall is located on the rear side Y2 of the cover accommodating unit 45. The rear wall is configured in the same manner as the front wall 64. The rear wall includes a guide rail in the same way as the front wall 64.

Cover Moving Unit 49

As shown in FIGS. 5 and 6, the printing device 10 includes a cover moving unit 49. The cover moving unit 49 is configured to move the maintenance cover 44. In particular, the cover moving unit 49 can move the maintenance cover 44 between the cover position and the accommodation position.

The cover moving unit 49 may include a cover drive unit 70. The cover drive unit 70 is a drive source for moving the maintenance cover 44. The cover drive unit 70 may be a motor.

The cover drive unit 70 operates based on an instruction from the control unit 46. Specifically, when an accommodating condition is satisfied, the cover drive unit 70 moves the maintenance cover 44 from the cover position to the accommodation position based on an instruction from the control unit 46. When a cover condition is satisfied, the cover drive unit 70 moves the maintenance cover 44 from the accommodation position to the cover position based on an instruction from the control unit 46.

The accommodating condition may be satisfied when the head 33 is disposed at the standby position and there is a print instruction. The accommodating condition may be satisfied when the head 33 is disposed at the standby position and the opening and closing cover 22 is closed. The cover condition may be satisfied when printing based on the print instruction is completed. The cover condition may be satisfied when the opening and closing cover 22 is open.

The cover moving unit 49 includes a driving gear 71 and the interlocking shaft 72. The driving gear 71 engages with the cover drive unit 70. The driving gear 71 is pivotally attached to the interlocking shaft 72. The driving gear 71 transmits power from the cover drive unit 70 to the interlocking shaft 72. The interlocking shaft 72 is located to extend in the front to rear direction Y. The interlocking shaft 72 is rotatable about an axis extending in the front to rear direction Y.

The cover moving unit 49 includes a pair of first pulleys 73, a pair of second pulleys 74, and a pair of elevating belts 75. The pair of first pulleys 73 are located on the front side Y1 and the rear side Y2 in the front to rear direction Y. Each of the pair of first pulleys 73 is pivotally attached to the interlocking shaft 72.

The pair of second pulleys 74 are located on the front side Y1 and the rear side Y2 in the front to rear direction Y. The pair of second pulleys 74 are respectively located on the upper side Z1 of the pair of first pulleys 73. Each of the pair of second pulleys 74 is rotatably held by the pulley holding unit 62.

The pair of elevating belts 75 are located on the front side Y1 and the rear side Y2 in the front to rear direction Y. The pair of elevating belts 75 are respectively wound around the pair of first pulleys 73 and the pair of second pulleys 74.

The cover moving unit 49 includes a pair of elevating units 76. The pair of elevating units 76 are located on the front side Y1 and the rear side Y2 in the front to rear direction Y. The pair of elevating units 76 are respectively fixed to the pair of elevating belts 75. The pair of elevating units 76 are slidable respectively along the pair of guide grooves 63. Each of the pair of elevating units 76 includes a coupling unit 76A. The coupling unit 76A is inserted into the opening 52F. The pair of elevating units 76 can raise and lower the maintenance cover 44 via the second cover unit 52.

In this way, in the cover moving unit 49, the power from the cover drive unit 70 is transmitted to the pair of elevating units 76 via the driving gear 71, the interlocking shaft 72, the pair of first pulleys 73, and the pair of elevating belts 75, and thus the maintenance cover 44 can be raised and lowered.

Also, the cover moving unit 49 can move the maintenance cover 44 along the guide rail 65. In particular, the cover moving unit 49 can switch a moving direction of the maintenance cover 44 between moving in the vertical direction Z and moving in the width direction X. That is, the cover moving unit 49 moves the maintenance cover 44 to change an orientation of the maintenance cover 44 between the cover position and the accommodation position.

The printing device 10 includes a cover detection unit 50. The cover detection unit 50 detects that the maintenance cover 44 is accommodated in the cover accommodating unit 45. The cover detection unit 50 may detect that the maintenance cover 44 is accommodated in the cover accommodating unit 45 by detecting that the elevating units 76 located on the rear side Y2 are disposed at a predetermined height.

Operations of First Embodiment

Operations of the first embodiment will be described.

Figure 8:
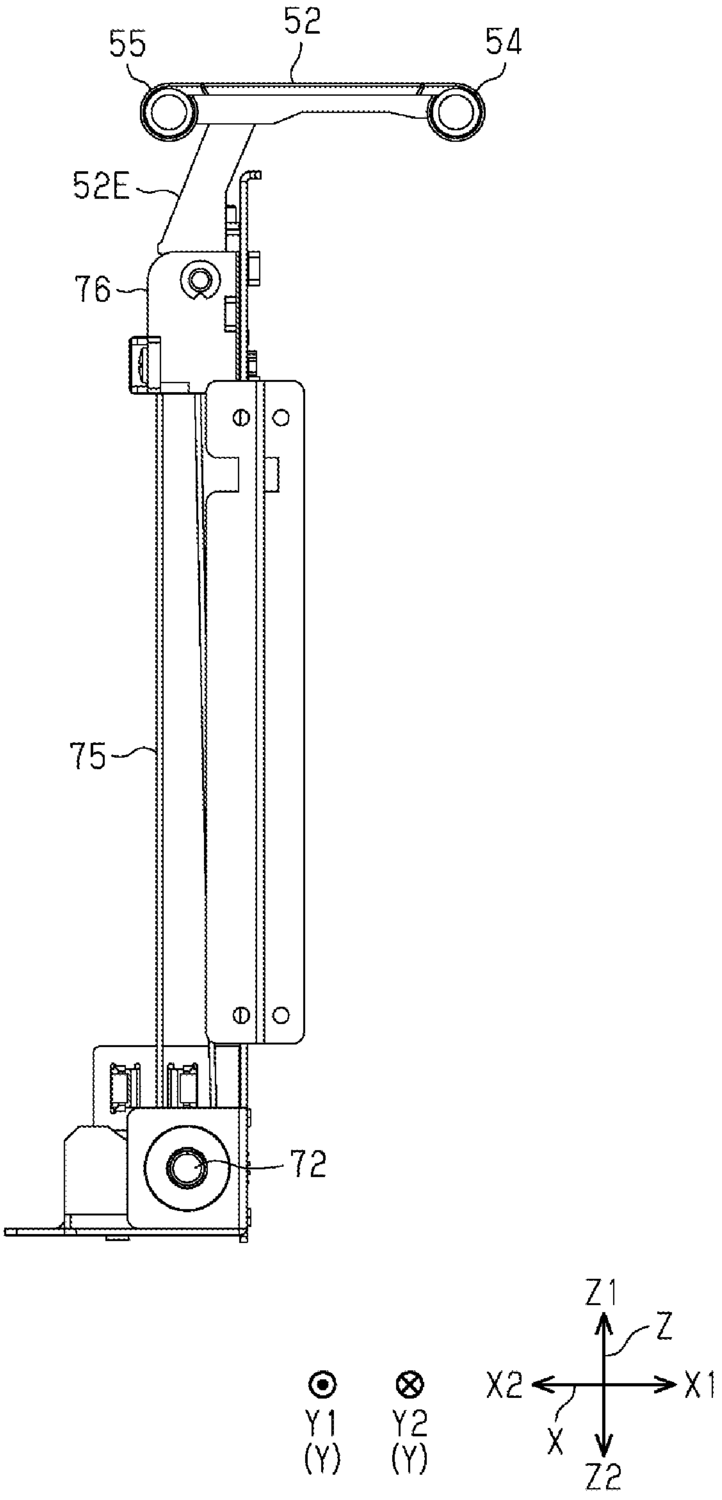
FIG. 8 is a front view showing a second cover unit.

As shown in FIGS. 7 and 8, the maintenance cover 44 is disposed at the cover position. At the cover position, the first cover unit 51 and the second cover unit 52 extend in the width direction X and cover the maintenance unit 40 from the upper side Z1. At the cover position, the third cover unit 53 covers the cover accommodating unit 45 from the upper side Z1 while it is inclined with respect to the width direction X.

When the accommodating condition is satisfied, the cover drive unit 70 is driven. Thus, the power from the cover drive unit 70 is transmitted to the interlocking shaft 72 via the driving gear 71, and the interlocking shaft 72 starts to rotate. Further, with the rotation of the interlocking shaft 72, the pair of elevating belts 75 are interlocked to move the pair of elevating units 76 from the upper side Z1 to the lower side Z2.

The second cover unit 52 is coupled to the pair of elevating units 76, and the second slider 56A moves along the guide rail 65. The first cover unit 51 is coupled to the second cover unit 52, and the first slider 51E moves along the guide rail 65. The third cover unit 53 is coupled to the second cover unit 52, and the third slider 57A moves along the guide rail 65.

Figure 9:
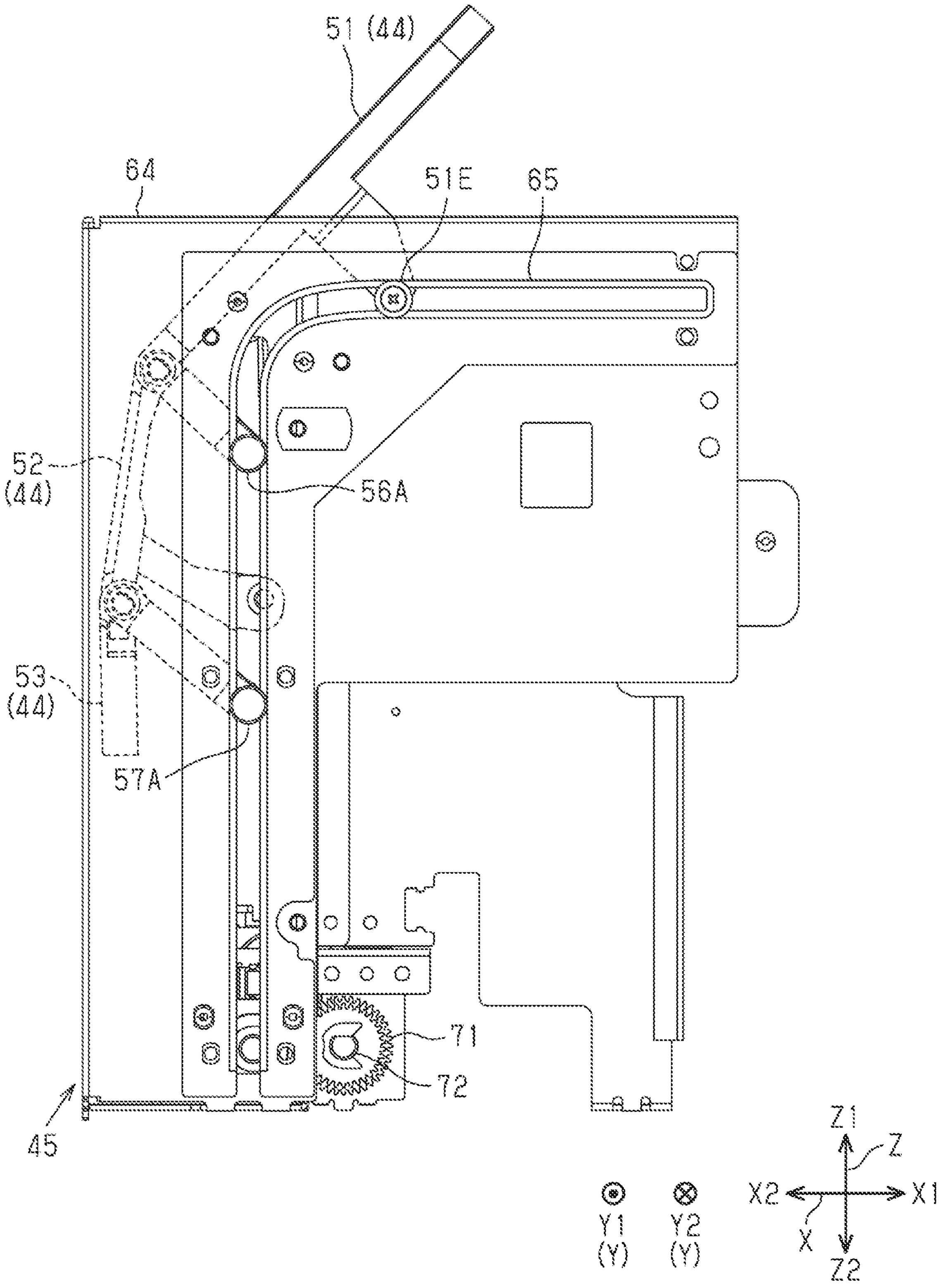
FIG. 9 is a front view showing the maintenance cover and the cover accommodating unit.
Figure 10:
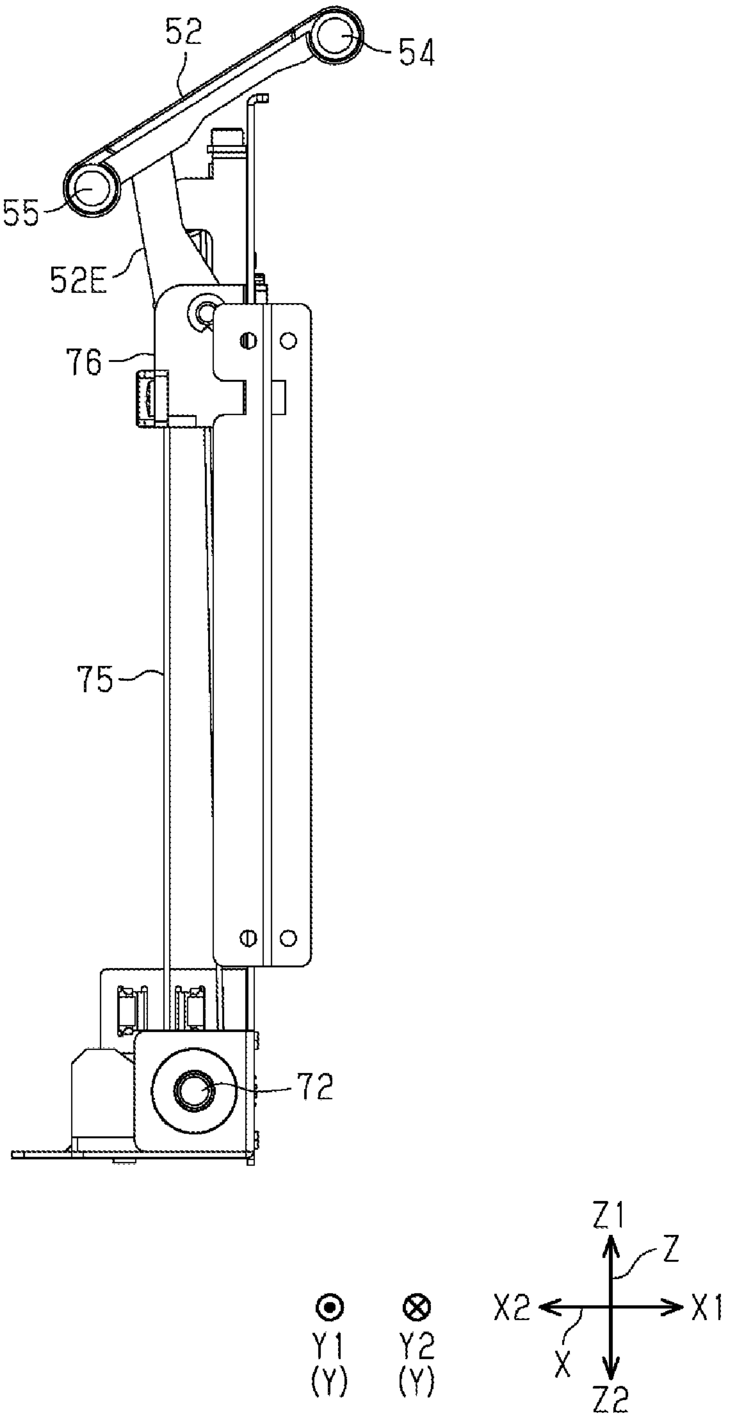
FIG. 10 is a front view showing the second cover unit.

Thus, as shown in FIGS. 9 and 10, the maintenance cover 44 moves so that the first slider 51E, the second slider 56A, and the third slider 57A move along the guide rail 65. In particular, the moving direction of the maintenance cover 44 is changed from the width direction X to the vertical direction Z.

Figure 11:
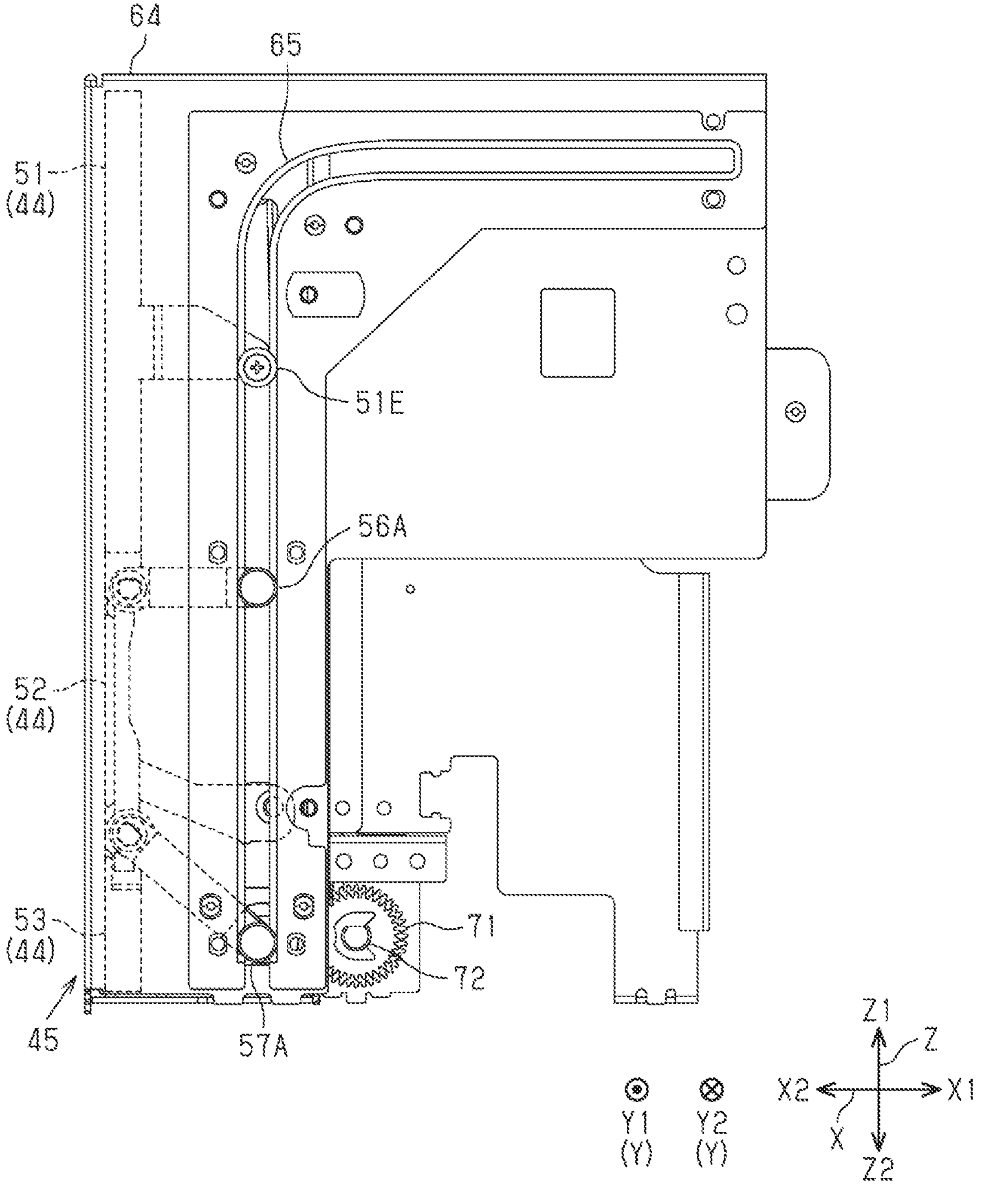
FIG. 11 is a front view showing the maintenance cover and the cover accommodating unit.
Figure 12:
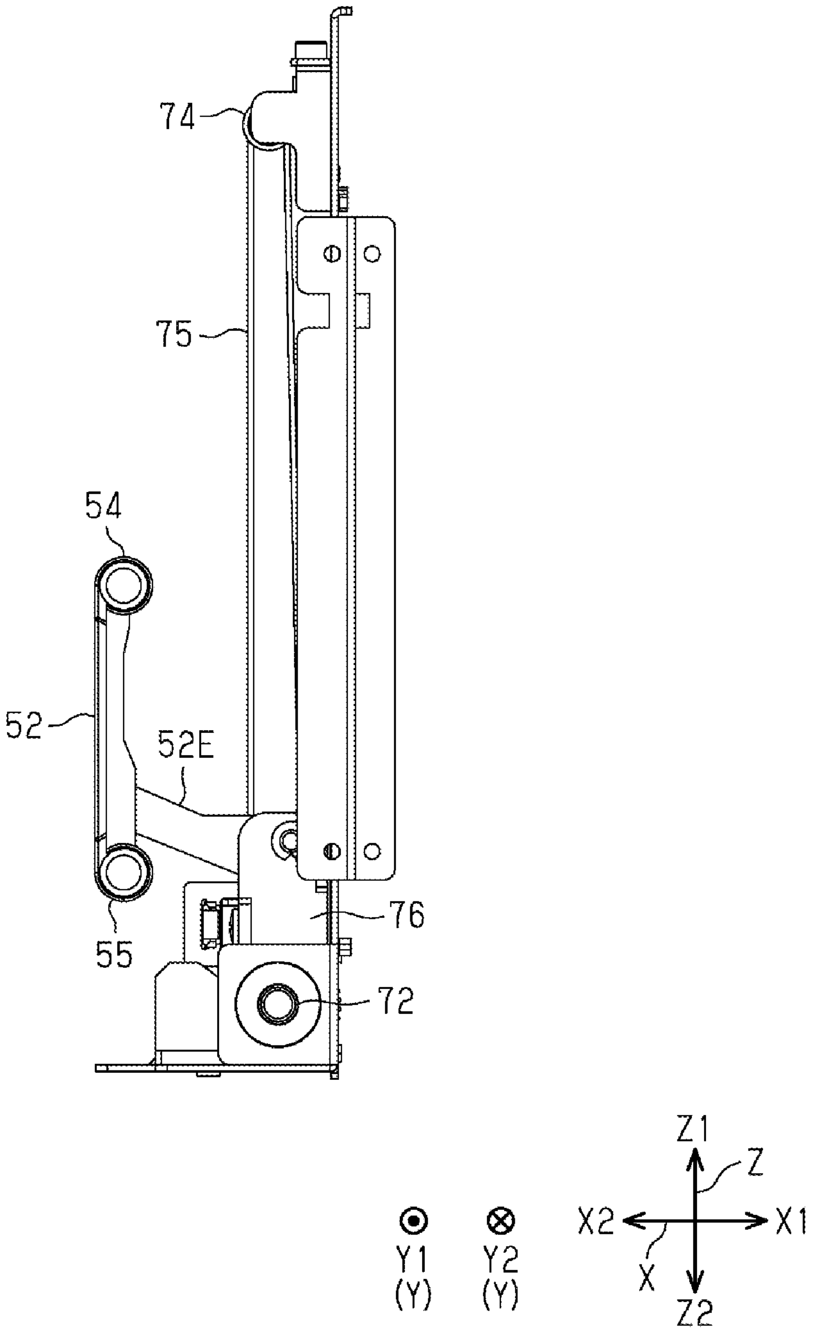
FIG. 12 is a front view showing the second cover unit.

After that, as shown in FIGS. 11 and 12, when the maintenance cover 44 is disposed at the accommodation position, as a result of detection by the cover detection unit 50, driving of the cover drive unit 70 ends At the accommodation position, the first cover unit 51, the second cover unit 52, and the third cover unit 53 are accommodated in the cover accommodating unit 45 while they extend in the vertical direction Z. Further, when the cover condition is satisfied, control is performed in the reverse order and direction to those when the accommodating condition is satisfied.

Effects of First Embodiment

Effects of the first embodiment will be described.

(1) At least the printing region of the medium is supported by the support surface 29, and the head 33 is moved in the width direction X and the front to rear direction Y parallel to the support surface 29. For this reason, there is no need to provide a configuration for moving the support surface 29 in a direction parallel to the support surface 29. Accordingly, a size of the printing device 10 can be reduced.

(2) In addition to this, the upper side Z1 of the maintenance unit 40 that can face the head 33 can be covered by the maintenance cover 44. For this reason, when the medium is placed on the support surface 29, even if the medium is located on the upper side Z1 of the maintenance unit 40, contamination of the medium with the liquid can be inhibited.

(3) When maintenance is performed on the head 33, the maintenance cover 44 can be accommodated. Thus, contamination of the medium with the liquid when the medium is placed on the support surface 29 can be inhibited, and printing quality can be improved due to maintenance of the head 33.

(4) Since the cover accommodating unit 45 is provided between the medium support unit 28 and the maintenance unit 40 in the width direction X, the liquid sprayed from the printing region can be made difficult to enter the maintenance unit 40. In addition, there is no need to provide a partition other than the cover accommodating unit 45 between the medium support unit 28 and the maintenance unit 40 in the width direction X, and space saving can be achieved.

(5) The cover moving unit 49 can move the maintenance cover 44 between the cover position and the accommodation position. Thus, the maintenance cover 44 can be easily switched between the cover position and the accommodation position.

(6) By changing the orientation of the maintenance cover 44 between the cover position and the accommodation position, a space for accommodating the maintenance cover 44 can be saved.

(7) It is possible to detect that the maintenance cover 44 is accommodated in the cover accommodating unit 45. Accordingly, reliability of the accommodation of the maintenance cover 44 can be improved.

(8) The flushing unit 41 extends in the front to rear direction Y, or the flushing unit 41 moves in the front to rear direction Y. In addition, by providing the cover accommodating unit 45 between the medium support unit 28 and the maintenance unit 40 in the width direction X, the maintenance cover 44 can be moved smoothly and space saving can be achieved.

(9) When the maintenance cover 44 is at the cover position, the positioning reference unit 48 can be visually recognized as a guide for placing the medium on the support surface 29. Thus, the medium can be accurately placed on the support surface 29. Accordingly, printing quality can be improved.

Modified Examples

The embodiment can be modified and implemented as follows. The embodiment and the following modified examples can be implemented in combination with each other within a range in which no technical contradictions arise.

- The positioning reference unit 48 may not be provided on the third upper surface 53A of the third cover unit 53. When the maintenance cover 44 is disposed at the cover position, the positioning reference unit 48 may be provided on the third upper surface 53A with a scale corresponding to its inclination angle with respect to a horizontal plane. That is, the positioning reference unit 48 may be provided such that the first upper surface 51A and the second upper surface 52A, which are not inclined with respect to the horizontal plane, and the third upper surface 53A inclined with respect to the horizontal plane have the same scale when viewed from the upper side Z1.
- When the maintenance cover 44 is disposed at the cover position, the third cover unit 53 may not be inclined with respect to the horizontal plane. When the maintenance cover 44 is disposed at the cover position, the third upper surface 53A of the third cover unit 53 may be horizontal. When the maintenance cover 44 is disposed at the cover position, the second cover unit 52 may be inclined with respect to the horizontal plane. When the maintenance cover 44 is disposed at the cover position, the first cover unit 51 may be inclined with respect to the horizontal plane.
- When the maintenance cover 44 is disposed at the cover position, the third cover unit 53 may cover the upper side Z1 of the maintenance unit 40. When the maintenance cover 44 is disposed at the cover position, a part of the third cover unit 53 may cover the upper side Z1 of the cover accommodating unit 45 and a part of the third cover unit 53 may cover the upper side Z1 of the maintenance unit 40. When the maintenance cover 44 is disposed at the cover position, a part of the second cover unit 52 may cover the upper side Z1 of the cover accommodating unit 45 and a part of the second cover unit 52 may cover the upper side Z1 of the maintenance unit 40.
- The maintenance cover 44 is movable in the width direction X, but is not limited thereto and may be movable in the front to rear direction Y, for example. The maintenance cover 44 may not be movable with respect to the vertical direction Z.
- The maintenance cover 44 covers the upper side Z1 of the maintenance unit 40 with one cover, but is not limited thereto and may cover the upper side Z1 of the maintenance unit 40 with a plurality of covers, for example. As a specific example, the printing device 10 may include a first maintenance cover and a second maintenance cover. The first maintenance cover may be movable in the first width direction X1, and the second maintenance cover may be movable in the second width direction X2. In addition, the first maintenance cover and the second maintenance cover may cover the upper side Z1 of the maintenance unit 40.
- The maintenance unit 40 may be provided on a side in the second width direction X2 from the medium support unit 28. The maintenance unit 40 may be provided on the front side Y1 of the medium support unit 28. The maintenance unit 40 may be provided on the rear side Y2 from the medium support unit 28. That is, the maintenance unit 40 may be provided at any position.
- The maintenance cover 44 may be provided on at least one of a side in the first width direction X1 of the medium support unit 28, a side in the second width direction X2 of the medium support unit 28, the front side Y1 of the medium support unit 28, and the rear side Y2 of the medium support unit 28.

The cover moving unit 49 may move the maintenance cover 44 using the power from the cover drive unit 70 in response to an operation of the operation unit 27. That is, the accommodating condition may be able to be satisfied in accordance with an operation of the operation unit 27. The cover condition may be able to be satisfied in response to an operation of the operation unit 27.

The cover moving unit 49 may move the maintenance cover 44 not using the power from the cover drive unit 70 but manually by the user. In this case, the cover moving unit 49 may not include the cover drive unit 70.

The cover detection unit 50 may detect that the maintenance cover 44 is disposed at the cover position. The cover detection unit 50 may detect that the maintenance cover 44 is disposed at any position between the accommodation position and the cover position.

The cover detection unit 50 may detect the position of the maintenance cover 44 based on a drive signal supplied to the cover drive unit 70.

The first opening portion 20 and the second opening portion 21 may not be configured to be continuous with each other and may be provided separately from each other. The opening portion 19 may not be provided across the top surface 16 and the front surface 12.

The opening portion 19 may be provided across the top surface 16, the front surface 12, and other surfaces. That is, the opening portion 19 may be provided across at least the top surface 16 and the front surface 12. Also, the opening portion 19 may be provided on the top surface 16 and not be provided on the front surface 12. That is, it is sufficient that the opening portion 19 be provided at least on the top surface 16.

The support surface 29 is configured not to move in the horizontal direction, but for example, the support surface 29 may be finely adjustable in the horizontal direction only when printing is not being performed, and may be configured such that it does not move in the horizontal direction at least when printing is being performed.

The first opening portion 20 may have a shape that is longer than the support surface 29 in the front to rear direction Y when viewed from the upper side Z1.

The printing unit 32 may perform printing when the head 33 moves in either the first width direction X1 or the second width direction X2, or may perform printing both when the head 33 moves in the first width direction X1 and when the head 33 moves in the second width direction X2.

The head 33 may include a nozzle surface parallel to the horizontal plane or may include a nozzle surface inclined with respect to the horizontal plane.

The maintenance unit 40 may not include at least one of the flushing unit 41, the wiping unit 42, the suction unit 43, and the waste liquid tank.

A relationship between the width direction X and the front to rear direction Y in the embodiment may be interchanged. That is, the width direction X of the embodiment may be the front to rear direction Y, and the front to rear direction Y of the embodiment may be the width direction X.

For example, the medium is not limited to the T-shirt, a polo shirt, or the like, and may be a sweatshirt, a hoodie, or the like, for example, or may be a medium serving as clothing. Further, the flexible medium is adopted as the medium, but the medium is not limited thereto and an inflexible medium such as a smartphone case printed using UV ink may be adopted, for example.

The printing device 10 may be configured to discharge ink serving as an example of the liquid, but may be configured to discharge a liquid other than ink. That is, the liquid can be arbitrarily selected as long as it can adhere to the medium to perform printing on the medium.

As used herein, the expression "at least one" means one or more of desired options. As an example, the expression "at least one" as used herein means only one option or both options if the number of options is two. As another example, the expression "at least one" as used herein means only one option or a combination of two or more options if the number of options is three or more.

Additional Notes

The technical ideas and effects obtained from the above-described embodiments and modifications will be described below.

(A) A printing device includes: a medium support unit including a support surface configured to support at least a printing region of a medium; a medium accommodating unit configured to accommodate a region of the medium not supported by the support surface; a head configured to discharge a liquid onto the medium supported by the support surface; a first head moving unit configured to move the head in a first direction parallel to the support surface; a second head moving unit configured to move the head in a second direction that is parallel to the support surface and intersects the first direction; a maintenance unit that is disposed at a position in the first direction of the medium support unit, at which the maintenance unit is configured to face the head in a third direction intersecting the first direction and the second direction, and performs maintenance of the head; and a maintenance cover configured to cover a side of the maintenance unit in the third direction configured to face the head in the maintenance unit.

According to this configuration, at least the printing region of the medium is supported by the support surface, and the head that can discharge the liquid onto the medium supported by the support surface is moved in the direction parallel to the support surface. For this reason, there is no need to provide a configuration for moving the support surface in the direction parallel to the support surface. Accordingly, the size of the printing device can be reduced.

In addition to this, the side of the maintenance unit in the third direction that can face the head can be covered by the maintenance cover. For this reason, when the medium is placed on the support surface, even if the medium is located in the third direction of the maintenance unit, contamination of the medium with the liquid can be inhibited.

(B) The printing device may include a cover accommodating unit configured to accommodate the maintenance cover.

According to this configuration, the maintenance cover can be accommodated when maintenance of the head is performed. Thus, contamination of the medium with the liquid when the medium is placed on the support surface can be inhibited, and printing quality can be improved due to the maintenance of the head.

(C) In the printing device, the cover accommodating unit may be provided between the medium support unit and the maintenance unit in the first direction.

According to this configuration, by providing the cover accommodating unit between the medium support unit and the maintenance unit in the first direction, the liquid sprayed from the printing region can be made difficult to enter the maintenance unit. In addition, there is no need to provide a partition other than the cover accommodating unit between the medium support unit and the maintenance unit in the first direction, and space saving can be achieved.

(D) The printing device may include a cover moving unit configured to move the maintenance cover, in which the cover moving unit may move the maintenance cover between a cover position and an accommodation position, the cover position may be a position at which the side of the maintenance unit in the third direction is covered, and the accommodation position may be a position at which the a position at which the is accommodated in the cover accommodating unit without covering the side of the maintenance unit in the third direction.

According to this configuration, the maintenance cover can be moved between the cover position and the accommodation position. Thus, the maintenance cover can be easily switched between the cover position and the accommodation position.

(E) In the printing device, the cover moving unit may move the maintenance cover to change an orientation of the maintenance cover between the cover position and the accommodation position.

According to this configuration, by changing the orientation of the maintenance cover between the cover position and the accommodation position, space saving for accommodating the maintenance cover can achieved. (F) The printing device may include a cover detection unit that detects that the maintenance cover is accommodated in the cover accommodating unit.

According to this configuration, it is possible to detect that the maintenance cover is accommodated in the cover accommodating unit. Thus, reliability of the accommodation of the maintenance cover can be improved.

(E) In the printing device, the maintenance unit may include a flushing unit configured to receive the liquid discharged from the head, and the flushing unit may extend in the second direction.

According to this configuration, assuming a configuration in which the flushing unit extends in the second direction, the maintenance cover is provided between the medium support unit and the maintenance unit in the first direction. Thus, the maintenance cover can be moved smoothly and space saving can be achieved.

(E) In the printing device, the maintenance unit may include a flushing unit configured to receive the liquid discharged from the head, and the flushing unit may move in the second direction together with the head.

According to this configuration, assuming a configuration in which the flushing unit moves in the second direction, the maintenance cover is provided between the medium support unit and the maintenance unit in the first direction. Thus, the maintenance cover can be moved smoothly and space saving can be achieved.

(I) In the printing device, the maintenance cover may include a positioning reference unit serving as a guide for placing the medium on the support surface at a position for covering the side of the maintenance unit in the third direction.

According to this configuration, by visually recognizing the positioning reference unit at the position at which the maintenance cover covers the side of the maintenance unit in the third direction, it can be used as a guide for placing the medium on the support surface. Thus, the medium can be accurately placed on the support surface. Accordingly, printing quality can be improved.

What is claimed is:

1. A printing device comprising:

a medium support unit including a support surface configured to support at least a printing region of a medium;

a medium accommodating unit configured to accommodate a region of the medium not supported by the support surface;

a head configured to discharge a liquid onto the medium supported by the support surface;

a first head moving unit configured to move the head in a first direction parallel to the support surface;

a second head moving unit configured to move the head in a second direction that is parallel to the support surface and intersects the first direction;

a maintenance unit that is disposed at a position in the first direction of the medium support unit, at which the maintenance unit is configured to face the head in a third direction intersecting the first direction and the second direction, and performs maintenance of the head;

a maintenance cover configured to cover a side of the maintenance unit in the third direction configured to face the head in the maintenance unit; and a cover accommodating unit configured to accommodate the maintenance cover.

2. The printing device according to claim 1, wherein the cover accommodating unit is provided between the medium support unit and the maintenance unit in the first direction.

3. The printing device according to claim 1, further comprising a cover moving unit configured to move the maintenance cover, wherein the cover moving unit is configured to move the maintenance cover between a cover position and an accommodation position, and the cover position is a position at which the side of the maintenance unit in the third direction is covered, and the accommodation position is a position at which the maintenance cover is accommodated in the cover accommodating unit without covering the side of the maintenance unit in the third direction.

4. The printing device according to claim 3, wherein the cover moving unit moves the maintenance cover to change an orientation of the maintenance cover between the cover position and the accommodation position.

5. The printing device according to claim 1, further comprising a cover detection unit configured to detect that the maintenance cover is accommodated in the cover accommodating unit.

6. The printing device according to claim 1, wherein the maintenance unit includes a flushing unit configured to receive the liquid discharged from the head, and the flushing unit extends in the second direction.

7. The printing device according to claim 1, wherein the maintenance unit includes a flushing unit configured to receive the liquid discharged from the head, and the flushing unit moves in the second direction together with the head.

8. The printing device according to claim 1, wherein the maintenance cover includes a positioning reference unit serving as a guide for placing the medium on the support surface at a position for covering the side of the maintenance unit in the third direction.

* * * * *